United States Patent [19]
Lotter et al.

[11] 3,797,377
[45] Mar. 19, 1974

[54] TILTABLE COOKING PAN

[75] Inventors: William Lotter; Frank De Vos, both of South Bend, Ind.

[73] Assignee: South Bend Range Corp., South Bend, Ind.

[22] Filed: May 18, 1972

[21] Appl. No.: 254,606

[52] U.S. Cl. .................................. 99/407, 99/424
[51] Int. Cl. ............................................. A47j 37/12
[58] Field of Search .. 99/424, 323.5, 323.9, 323.11, 99/339, 373, 380, 395–396, 397–398, 407, 409, 423, 427; 141/271

[56] References Cited
UNITED STATES PATENTS

| | | | |
|---|---|---|---|
| 2,108,627 | 2/1938 | Tyler | 99/407 X |
| 2,113,091 | 4/1938 | Mills | 99/407 X |
| 2,510,866 | 6/1950 | Currier | 99/407 |
| 2,604,030 | 7/1952 | Cretors | 99/323.9 |
| 3,068,912 | 12/1962 | Shaw | 99/407 X |

FOREIGN PATENTS OR APPLICATIONS

| 999,050 | 9/1951 | France | 99/409 |
|---|---|---|---|

*Primary Examiner*—Peter Feldman
*Assistant Examiner*—Arthur O. Henderson
*Attorney, Agent, or Firm*—Oltsch & Knoblock

[57] ABSTRACT

A tiltable cooking pan which is pivotally connected to a support at the front wall section of the pan. A rigid actuator rod has one end pivotally connected to the pan rearwardly and above the pivot connection of the pan to the support. The opposite end of the actuator rod is connected to a slide member which, upon fore and aft shiftable movement relative to the pan and support, causes the pan to be raised and lowered about its support pivot connection.

8 Claims, 10 Drawing Figures

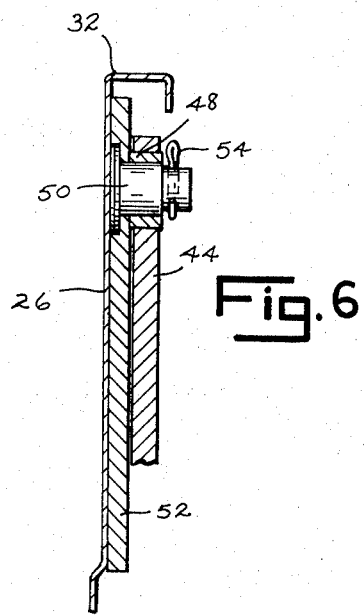
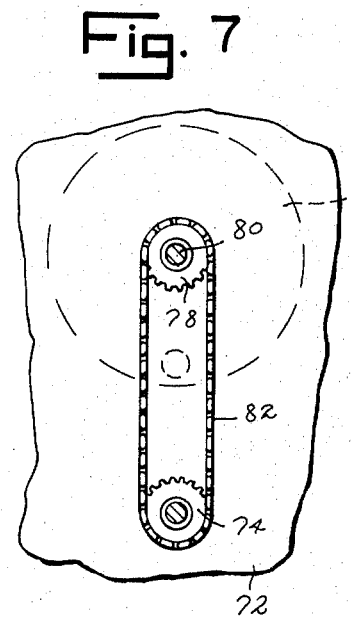
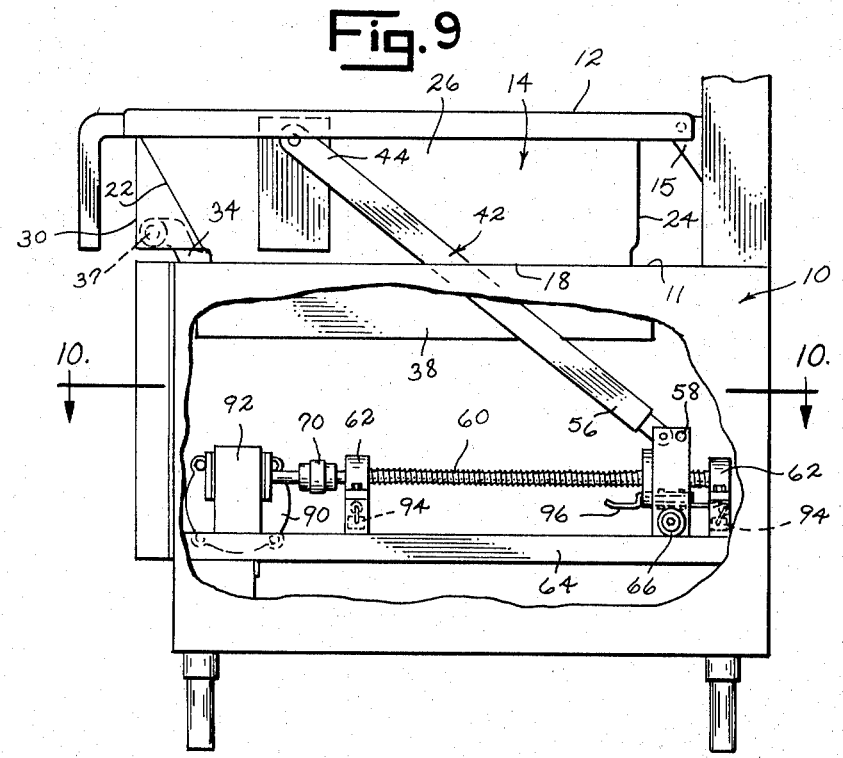

3,797,377

TILTABLE COOKING PAN

SUMMARY OF THE INVENTION

This invention relates to a tiltable cooking pan which can be used for braising, frying, stewing and other similar culinary processes.

The tiltable cooking pan of this inventon is an improvement upon similar prior art cooking devices, such as the kettle illustrated in U. S. Pat. No. 3,068,912. In this invention the cooking pan is carried upon a support and is pivotally connected to the support at or near the front wall section of the pan so as to be shiftable about a horizontal axis. A rigid actuator rod has its upper end pivotally connected to a side wall section of the pan rearwardly and above the pivot connection of the pan to the support. The lower end of the actuator rod is positioned below and rearwardly of the pan to support pivot connection. A shiftable member, which may be actuated by hand or by a drive motor, is connected to the lower end of the actuator rod and is shiftable forwardly and rearwardly relative to the pan so as to cause the pan to be shifted from a level cooking position into a tilted pouring position about its pivot connection to the support.

It is an object of this invention to provide a cooking pan which is carried upon a shiftable support and which is pivoted to the support at or near the forward marginal edge portion of the pan.

Another object of this invention is to provide a cooking pan which is pivotally connected for exertion free shiftable movement about a horizontal axis to a suitable support adjacent the forward edge portion of the pan.

Still another object of this invention is to provide a cooking pan which is tiltable between a horizontal cooking position and a dump or pouring position in a rapid and simple manner.

Other objects of this invention will become apparent upon a reading of the invention's description.

BRIEF DESCRIPTION OF THE DRAWINGS

FIG. 6 is a detailed sectional view taken along line 6—6 of FIG. 5.

FIG. 7 is a fragmentary sectional view taken along line 7—7 of FIG. 4.

FIG. 9 is a side view of a modified embodiment of the cooking device of this invention shown with portions of the side wall of the device broken away so as to illustrate a modified tilting mechanism for the pan.

DESCRIPTION OF THE PREFERRED EMBODIMENTS

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

The cooking device illustrated in FIGS. 1–8 includes a support 10 having a top 11. A cooking pan 14 is carried by support 10. A lid 12 is utilized to cover pan 14 and is pivotally connected at 15 to support 10. Lid 16 is shiftable between the closed position shown in FIG. 1 and the open position shown in FIG. 2.

Figure 1:
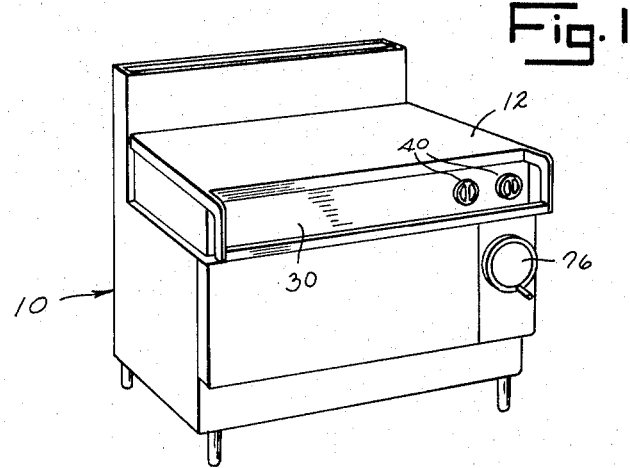
FIG. 1 is a perspective view of a cooking device which includes the tiltable cooking pan of this invention.
Figure 2:
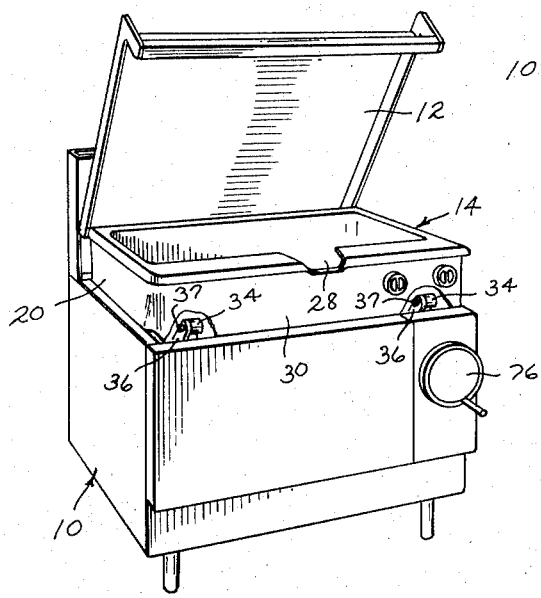
FIG. 2 is a perspective view of the cooking device of FIG. 1 shown with the lid thereof raised to expose the cooking pan in its horizontal cooking position.
Figure 3:
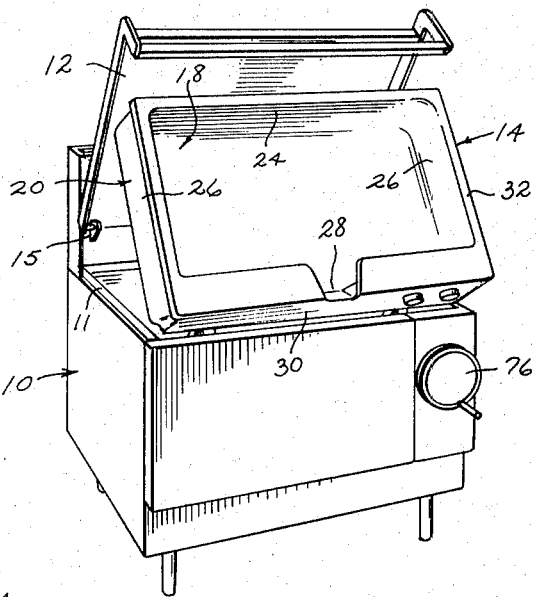
FIG. 3 is a perspective view of the cooking device of FIG. 1 showing the cooking pan tilted into its pouring position.
Figures 4, 5:
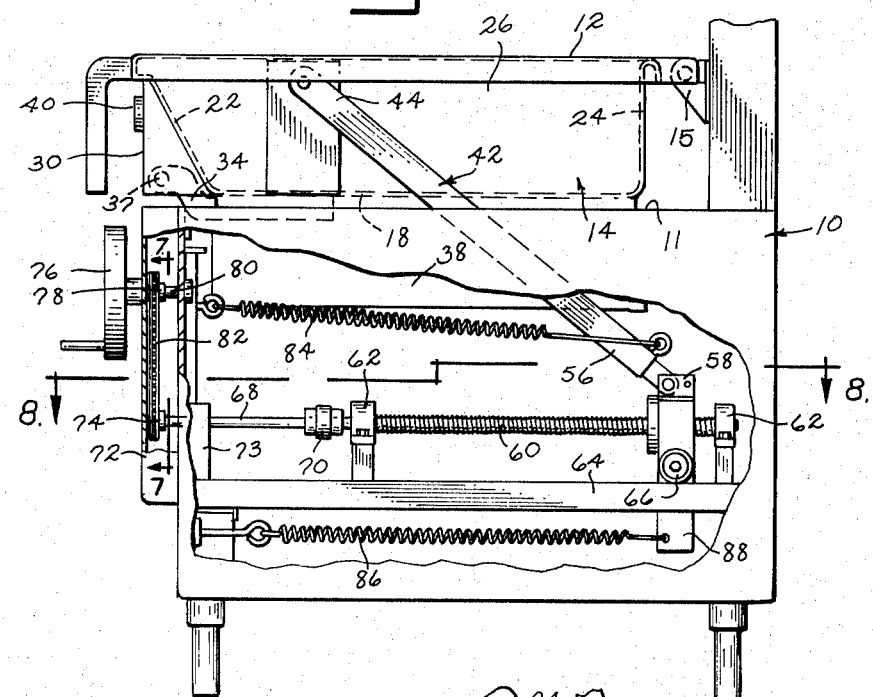
FIG. 4 is a side view of the cooking device as seen from the right of FIG. 1 with portions of the side wall of the device broken away to show the actuating mechanism for tilting the pan.
FIG. 5 is a fragmentary side view of the cooking device of FIG. 1 as viewed from the right and with portions of the side wall of the device broken away so as to illustrate the cooking pan in its tilted position.
Figure 8:
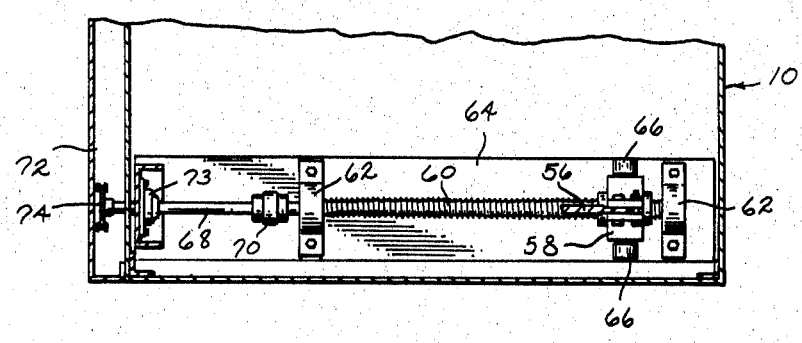
FIG. 8 is a sectional view taken along line 8—8 of FIG. 4.

Pan 14 has a bottom wall 18 and a side wall 20 which includes a front wall section 22, rear wall section 24, and spaced side wall sections 26. Front wall section 22 of pan 14 is inclined and tapers forwardly from side wall sections 26 to the center of the wall section where a cut-out 28 which defines a pouring lip is formed therein. A front panel 30 is secured to the upper marginal edge portion 32 of the pan along its front wall section 22 so as to define a skirt in front of the front wall section. A pair of laterally spaced pivot links 34 are connected to bottom wall 18 of pan 14 and terminate between front wall section 22 and front panel 30 of the pan. A pair of laterally spaced pivot members 36 are secured to a forward edge of support 10 adjacent top 11. Members 36 are pivotally connected at 37 to pivot links 34 so that pan 24 can be shifted between the horizontal cooking position as shown in FIGS. 1, 2 and 4, in which the pan rests upon support top 11 and a tilted or pouring position as shown in FIGS. 3 and 5 whereby the contents of the pan can be poured into a container located under pan cut-out 28.

A suitable electric or gas-fired heating element, designated generally by the reference numeral 38 and shown for illustrative purposes in box form, is carried by support 10 adjacently below top 11. Top 11 is preferably open directly above heating element 38 so as to directly expose bottom wall 18 of pan 14 to the heat from heating element 38 when the pan is in its cooking position. Suitable on-off and temperature and timer controls 40 for heater element 38 are mounted to front panel 30 of pan 14 and are connected to suitable electrical power elements housed within support 10.

A rigid actuator rod 42 extends between pan 14 and support 10 and through the opening of support top 11. One end 44 of rod 42 is pivotally connected to a side wall section 26 of pan 14 near the marginal edge portion 32 of the pan and slightly rearwardly of the pivot connection 37 of the pan to support 10. The detailed illustration shown in FIG. 6 is one means of pivotally connecting end 44 of rod 42 to the side wall section 26 of pan 14. As illustrated in FIG. 6, end 44 of the rod is fitted with a bushing 48 which is journaled over a pin 50 secured by a plate 52 to the outer face of a side wall section 26 of the pan. A cotter pin 54 extends through pin 50 and serves to retain the actuator rod upon pin 50. As best illustrated in FIGS. 4 and 5, end 44 of rod 42 is pivoted to pan 14 at a location above and rearwardly of the pivot connection 37 of the pan to support 10. The opposite end 56 of rod 42 is pivotally connected to a slide member 58 which is carried for forward and rearward shiftable movement relative to pan 14 upon an elongated rotative member 60. While the slide member 58 and rotative member 60 may assume a variety of constructions, it is preferable to utilize a ball bearing screw combination, such as that manufactured by the Saginaw Steering Gear Division of General Motors Corporation, in which slide member 58 constitutes a ball nut having a plurality of bearing members therein which ride in helical grooves formed on an elongated ball screw constituting the rotative member 60. Rotative member 60 is journaled in suitable bearing members 62 mounted to frame part 64 of support 10. To provide added support for slide member 58, a pair of wheels 66 are connected to the slide member and make rolling contact with support frame part 64 as the slide member is traversed durng rotation of member 60. A drive shaft 68 is coaxially connected at one end by a coupler 70 to rotative member 60 and extends into a front wall panel 72 of support 10. Drive shaft 68 is supported by a bearing 73 and carries a sprocket 74. A hand crank 76 is journaled in front panel 72. A sprocket 78 is secured to shaft 80 of crank 76. An endless drive chain 82 passes around sprockets 74 and 78. Rotation of hand crank 76 causes drive shaft 68 and rotative member 60 to be rotated and slide member 58 to shift forwardly and rearwardly between bearing members 62.

Lower end 56 of actuator rod 42 is located below and rearwardly of the pan to support pivot connection 37. Rotative movement of hand crank 76 causes shiftable movement of slide member 58 along rotative member 60 in a substantially horizontal orientation. This movement of member 58 causes pan 14 to be shifted between the generally horizontal cooking position illustrated in FIG. 4 and the tilted position illustrated in FIG. 5. Rotative member 60 is preferably of sufficient length so as to permit pan 14 to be pivoted through a 75° to 85° angle.

When utilizing a ball bearing screw combination instead of an ordinary worm gear or similar combination for slide member 58 and rotative member 60, there may be a tendency, after pan 14 is shifted into its tilted or pouring position and hand crank 76 is released, for the pan due to its weight to urge slide member 58 rearwardly along rotative member 60 and to settle back down into its horizontal position. This tendency for pan 14 to so settle into its horizontal or cooking position may be prevented by utilizing helical springs 84 and 86 which are connected to the tilt-actuating means so as to urge the pan into its tilted position, thus serving as a counterbalance for the weight of the pan. Spring 84 is connected between support 10 and end 56 of actuator rod 42, and spring 86 is connected between support 10 and a plate 88 secured to slide member 58. Springs 84 and 86 are designed so as not to automatically cause pan 14 to be shifted from its horizontal into its tilted position. The springs will make the pan easier to tilt but rotation of hand crank 76 will still be required to raise and lower the pan. It is to be understood that in some embodiments of this invention, depending upon the construction and types of slide member 58 and rotative member 60, biasing members such as spring 84 and 86 would not be necessary.

Figure 10:
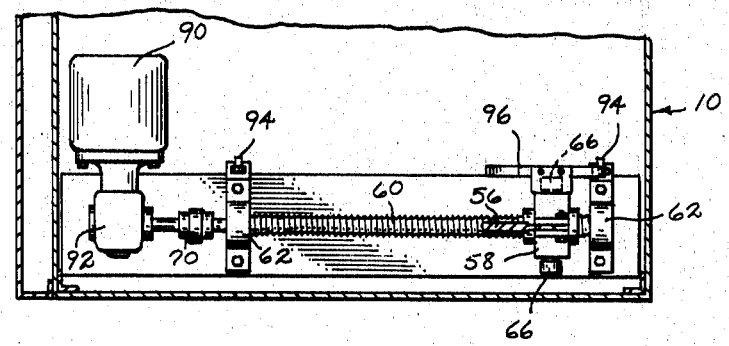
FIG. 10 is a sectional view taken along line 10—10 of FIG. 9.

The embodiment of the cooking device illustrated in FIGS. 9 and 10 is similar in construction to the embodiment above described, with the exception that the hand crank 76 of the above embodiment has been deleted and an electric drive motor 90 substituted. Drive moror 90 which is actuated by a convenient switch mounted to support 10 is drive connected by angle drive 92 to coupler 70. Limit switches 94 are connected to bearing members 62 and are positioned so as to be contacted by a trip 96 carried by slide member 58. Actuation of motor 90 causes rotation of rotative member 60 and shiftable movement of slide member 58 between bearing members 62 with limit switches 94 serving to stop motor 90 when the pan 14 reaches its horizontal position and its fully tilted position. Spring 84 and 86 above described need not be utilized. The actuation of the embodiment of the cooking device illustrated in FIGS. 9 and 10 is similar to the actuation of the device illustrated in FIGS. 1–8 with the exception that drive motor 90 is utilized to turn rotative member 60 instead of hand crank 74.

It is to be understood that the invention is not to be limited to the details herein given but may be modified within the scope of the appended claims.

What we claim is:

1. A tiltable cooking pan having a side wall with front and side sections, said pan carried upon a support, means pivotally connecting said pan adjacent its front wall section to said support for pivotal movement about a horizontal axis, the improvement comprising a rigid actuator rod having upper and lower ends, means pivotally connecting the upper end of said rod to one pan side wall section above and rearwardly of said pan to support pivot means, the lower end of said rod positioned below and rearwardly of said pan to support pivot means in all operative positions of the pan, actuator means carried by said support and connected to the lower end of said rod for shifting said lower rod end forwardly and rearwardly relative to said pan in a horizontal path to pivotally raise and lower said pan in selected incremental movements about said pan to support pivot means and thereby position said pan at a selected angle of tilt.

2. A tiltable cooking pan having a side wall with front and side sections, said pan carried upon a support, means pivotally connecting said pan adjacent its front wall section to said support for pivotal movement about a horizontal axis, the improvement comprising a rigid actuator rod having upper and lower ends, means pivotally connecting the upper end of said rod to one pan side wall section above and rearwardly of said pan to support pivot means, the lower end of said rod positioned below and rearwardly of said pan to support pivot means in all operative positions of the pan, actuator means carried by said support and connected to the lower end of said rod for shifting said lower rod end forwardly and rearwardly relative to said pan to pivotally raise and lower said pan about said pan to support pivot means, said actuator means including a rotative member having a substantially horizontal axis of rotation and a shiftable member carried by said rotatable member, means connecting said shiftable member to said rotative member for movement along said horizontal axis upon rotation of said rotative member, and means pivotally connecting said lower rod end to said shiftable member.

3. The cooking pan of claim 2 wherein said actuator means includes a hand crank means connected to said rotative member for imparting rotation to said rotative member.

4. The cooking pan of claim 3 including yieldable biasing means connected between said support and at least one of said rod and shiftable member normally urging said lower rod end forwardly relative to said pan.

5. The cooking pan of claim 2 wherein said actuator means includes a drive motor means operatively connected to said rotative member for imparting rotation to said rotative member.

6. The cooking pan of claim 2 including means in contact with said support for supporting said shiftable member as it moves along said rotative member.

7. The cooking pan of claim 6 wherein said shiftable member supporting means includes wheel means carried by said shiftable member in rolling contact with said support.

8. The cooking pan of claim 2 wherein said pan includes an upper marginal edge portion and said side wall thereof includes a rear section, said pan to support pivot means located at said marginal edge portion between said front and rear wall sections of the pan.

* * * * *